United States Patent
Kawabe et al.

(10) Patent No.: US 6,535,982 B1
(45) Date of Patent: Mar. 18, 2003

(54) SEMICONDUCTOR INTEGRATED CIRCUIT EMPLOYING POWER MANAGEMENT DEVICE AND POWER MANAGEMENT METHOD FOR THE SEMICONDUCTOR INTEGRATED CIRCUIT

(75) Inventors: Naoyuki Kawabe, Kanagawa-ken (JP); Kimiyoshi Usami, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/393,319

(22) Filed: Sep. 10, 1999

(30) Foreign Application Priority Data

Oct. 2, 1998 (JP) .......................................... 10-281610

(51) Int. Cl.$^7$ .............................. G06F 1/26; G06F 1/04
(52) U.S. Cl. ...................... 713/300; 713/323; 713/322; 713/601
(58) Field of Search ................................ 713/300, 323, 713/322, 601; 712/208

(56) References Cited

U.S. PATENT DOCUMENTS

| | | | | |
|---|---|---|---|---|
| 4,891,753 A | * | 1/1990 | Budde et al. ................ 364/200 |
| 5,083,266 A | * | 1/1992 | Watanabe .................... 713/601 |
| 5,734,913 A | * | 3/1998 | Iwamura et al. ............. 713/322 |
| 5,982,643 A | * | 11/1999 | Phlipot ......................... 363/25 |
| 6,115,806 A | * | 9/2000 | Yoshida ....................... 712/210 |

* cited by examiner

Primary Examiner—Thomas Lee
Assistant Examiner—Eric Chang
(74) Attorney, Agent, or Firm—Foley & Lardner

(57) ABSTRACT

A semiconductor integrated circuit has a CPU for executing various processes, at least one hardware module for receiving instructions from the CPU and executing the instructions, and a power management device for controlling the supply of a clock signal to the CPU so as to stop the clock signal to the CPU if the CPU has an idle time to start the next process. The power management device stops the supply of the clock signal to the CPU during a period in which the CPU can sleep, thereby reducing the power consumption of the CPU.

18 Claims, 15 Drawing Sheets

PMM : POWER MANAGEMENT MODULE
HWM: HARD WARE MODULE

HWM : HARD WARE MODULE

PMM : POWER MANAGEMENT MODULE
HWM: HARD WARE MODULE

PMM : POWER MANAGEMENT MODULE
HWM: HARD WARE MODULE

PMM : POWER MANAGEMENT MODULE
HWM: HARD WARE MODULE

FIG.15
PRIOR ART
```
LABEL1 : mfc    r2,    state
         andi   r2,    r2,    0×0003
         bne    r2,    r0,    LABEL1
         nop
```
FIG.16
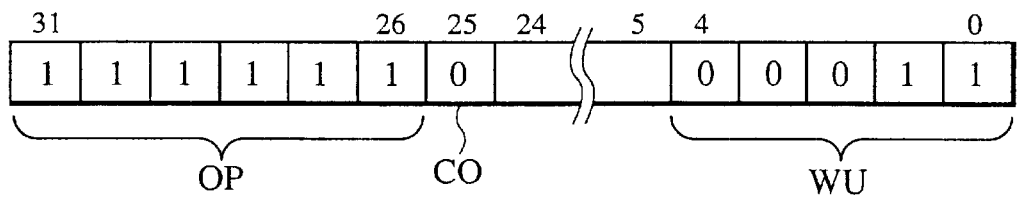
FIG.17
PRIOR ART
```
         add    r3,    r0,    0×0003
LABEL2 : mfc    r2,    state
         and    r2,    r2,    r3
         beq    r2,    r3,    LABEL2
         nop
```
FIG.18
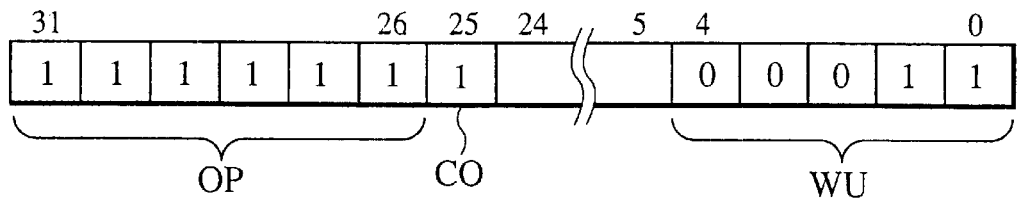

```
$const
    state  r0  and  or
$var
    reg1  reg2  reg3  reg4  imm1  imm2
$label
    LABEL1    LABEL2
$table
$stream
    LABEL1:mfc      reg1,  state
                    andi   reg2, reg1, imm1
                    bea    reg2, r0,   LABEL 1
                    nop
$format
                    sleep and, imm1
$endtable $table
$stream
                    add    reg3, r0, imm2
    LABEL2:mfc      reg4,  state
                    and    reg4, reg3
                    bea    reg4, reg3, LABEL 2
                    nop
$format
                    sleep or imm2
$esdtable
```

FIG.20

SEMICONDUCTOR INTEGRATED CIRCUIT EMPLOYING POWER MANAGEMENT DEVICE AND POWER MANAGEMENT METHOD FOR THE SEMICONDUCTOR INTEGRATED CIRCUIT

BACKGROUND OF THE INVENTION

1. Field of the Invention

The present invention relates to a semiconductor integrated circuit having a central processing unit and at least one hardware module on a semiconductor chip, and particularly, to a power management device and power management method for reducing the power consumption of the central processing unit of such a semiconductor integrated circuit.

2. Description of the Prior Art

FIG. 1 shows an example of a system LSI formed on a semiconductor chip 10. The LSI has a central processing unit (CPU) 12, hardware modules 14 (14-1 to 14-n), and a memory 16 for storing instructions and data. The CPU 12 executes processes and issues instructions to the modules 14 while monitoring the operating states of the modules 14. The CPU 12 monitors each module 14 to determine whether the module is processing an instruction, or has completed the processing of an instruction and is waiting for the next instruction, or is sleeping to temporarily stop its operation.

Two techniques for reducing the power consumption of the system LSI shown in FIG. 1 will be explained. A first technique stops the supply of a clock signal CLK by the CPU 12 to the modules 14 to put the modules into a sleep state while the modules 14 are not operating. A second technique makes the modules 14 automatically put themselves into a sleep state after processing instructions. These techniques make the modules 14 sleep if the modules are not operating, to reduce the power consumption of the chip 10 as a whole. The power consumption of the system LSI, however, is mostly attributed to the CPU 12. It is important, therefore, to reduce the power consumption of not only the modules 14 but also the CPU 12.

Reducing the power consumption of the CPU 12 will be realized by putting the CPU 12 into a sleep state if it does not interfere with the operation of the CPU 12. The CPU 12 can sleep during a period in which the modules 14 are processing instructions and the CPU 12 must wait for the completion of the processes of the modules 14 to start the next substantial process. More precisely, the CPU 12 is idle and can sleep if the modules 14 are executing a first process and if the next substantial process of the CPU 12 is dependent on a result of the first process.

To put the CPU 12 into a sleep state, there is a hardware control technique. This technique is unable to estimate the next operation of the CPU 12, and therefore, deteriorates the performance of the chip 10 and is inefficient in reducing power consumption. Due to no estimation of CPU operation, the hardware control technique frequently wakes up the CPU 12 just after putting it into a sleep state, or keeps the CPU 12 awaken even when the CPU 12 can sleep. Strictly controlling the timing of putting the CPU 12 into a sleep state needs large hardware that consumes large power. There is a software control technique for putting the CPU 12 into a sleep state. This technique estimates a sleep period of the CPU 12 in advance and issues an instruction to inform the CPU 12 of the sleep period. In response to the instruction, the CPU 12 puts itself into a sleep state. After the completion of the sleep period, the CPU 12 wakes up. If the estimated sleep period is longer than an actual idle period of the CPU 12, the CPU 12 must uselessly sleep to deteriorate the performance of the chip. On the other hand, if the estimated sleep period is too short, the clock signal CLK will be supplied to the CPU 12 that is still allowed to sleep, thereby wasting power.

SUMMARY OF THE INVENTION

An object of the present invention is to provide a semiconductor integrated circuit and a power management method for the circuit, capable of properly putting a CPU into a sleep state to reduce power consumption.

In order to accomplish the object, the present invention provides a semiconductor integrated circuit of FIG. 2. This has a CPU 12 for executing various processes, at least one hardware module 14 for receiving instructions from the CPU and executing the instructions, and a power management device 18 for controlling the supply of a clock signal to the CPU so as to stop the clock signal to the CPU if the CPU has an idle time to start the next process. The power management device 18 is structured as shown in FIG. 6. Namely, the power management device has a first storage circuit 24 for storing data related to a combination of the hardware modules specified by a sleep instruction, a second storage circuit 26 for storing data indicating whether or not the hardware modules have completed the execution of instructions, a comparator 22 for determining whether or not data in the first and second storage circuits agree with each other, and a controller (28 plus 30) for stopping the supply of the clock signal to the CPU when the sleep instruction is executed and resuming the supply of the clock signal to the CPU when the comparator determines that data in the first and second storage circuits agree with each other.

The present invention employs a sleep instruction to control the timing of making the CPU 12 sleep so that a programmer may optionally determine the timing of putting the CPU 12 into a sleep state. The present invention keeps the CPU 12 sleeping for a correct period without deteriorating the performance of a system LSI in which the CPU 12 is installed. The present invention needs no estimation of a sleep period because the power management device 18 controls the wake-up timing of the CPU 12 and makes the CPU 12 sleep for a proper period. As a result, the present invention greatly reduces the power consumption of the LSI without deteriorating the performance thereof. The power management device 18 is simple in hardware, and therefore, involves a small area and a small power-consumption overhead.

The present invention replaces a conventional termination routine composed of a plurality of instructions with a single sleep instruction, thereby reducing a necessary memory space for storing instructions, as well as reducing the number of instructions to execute. While the CPU 12 is sleeping, the instruction memory is not accessed so that the instruction memory can also be put into a sleep state. As a result, the present invention reduces the power consumption of not only the CPU but also the instruction memory.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 15 shows a routine of a program according to the prior art;

FIG. 16 shows a sleep instruction which corresponds to the routine of FIG. 15 according to a third embodiment of the present invention;

FIG. 17 shows a routine of a program according to the prior art;

FIG. 18 shows a sleep instruction which corresponds to the routine of FIG. 17 according to the third embodiment of the present invention;

FIG. 20 shows an example of a conversion table used in step S102 of FIG. 19.

DETAILED DESCRIPTION OF THE EMBODIMENTS

Figure 1:
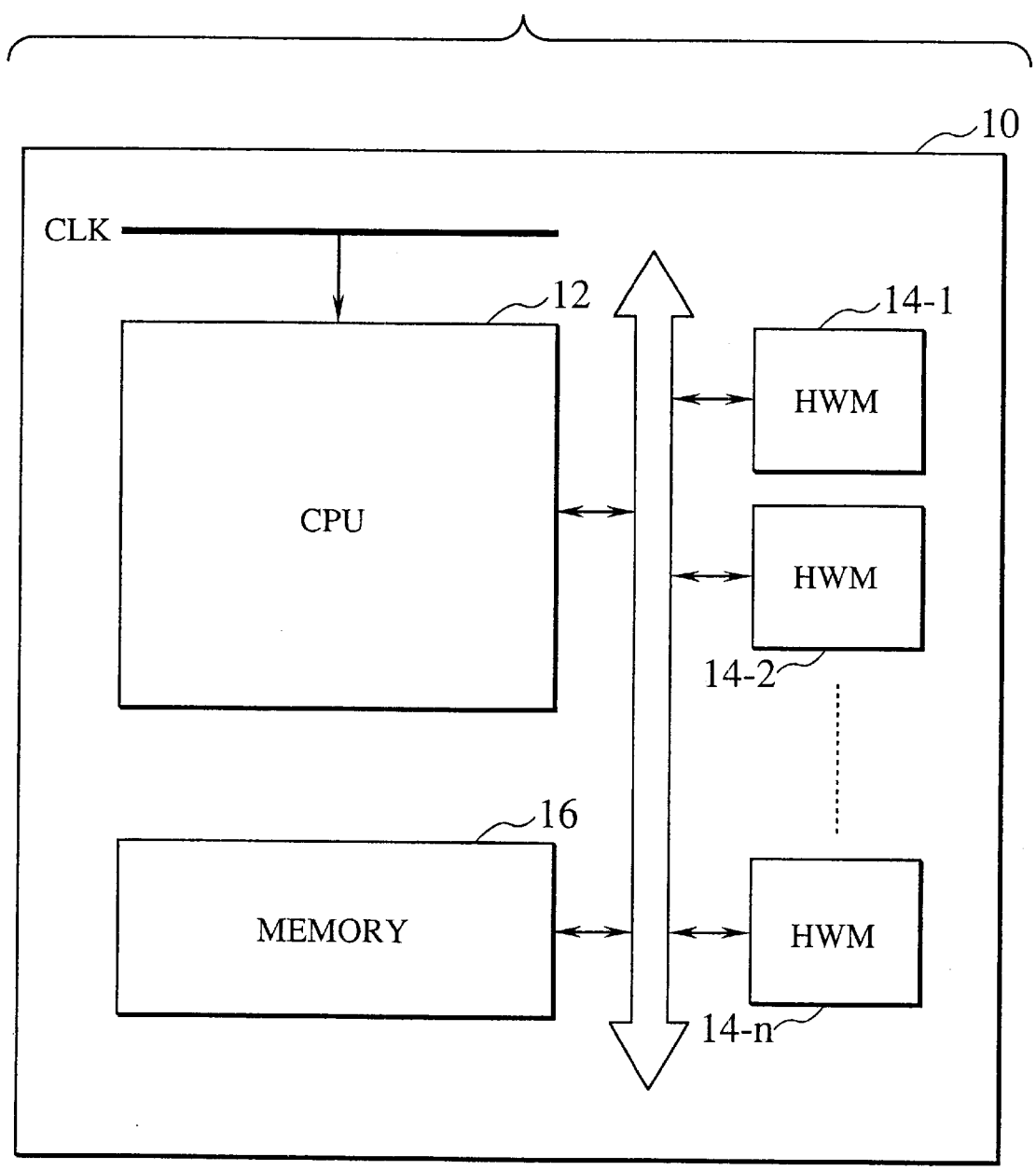
FIG. 1 is a block diagram showing a semiconductor integrated circuit according to a prior art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Semiconductor integrated circuits according to the first to third embodiments of the present invention will be explained. Thereafter, a power management method for a semiconductor integrated circuit according to the present invention will be explained.

First Embodiment

Figure 2:
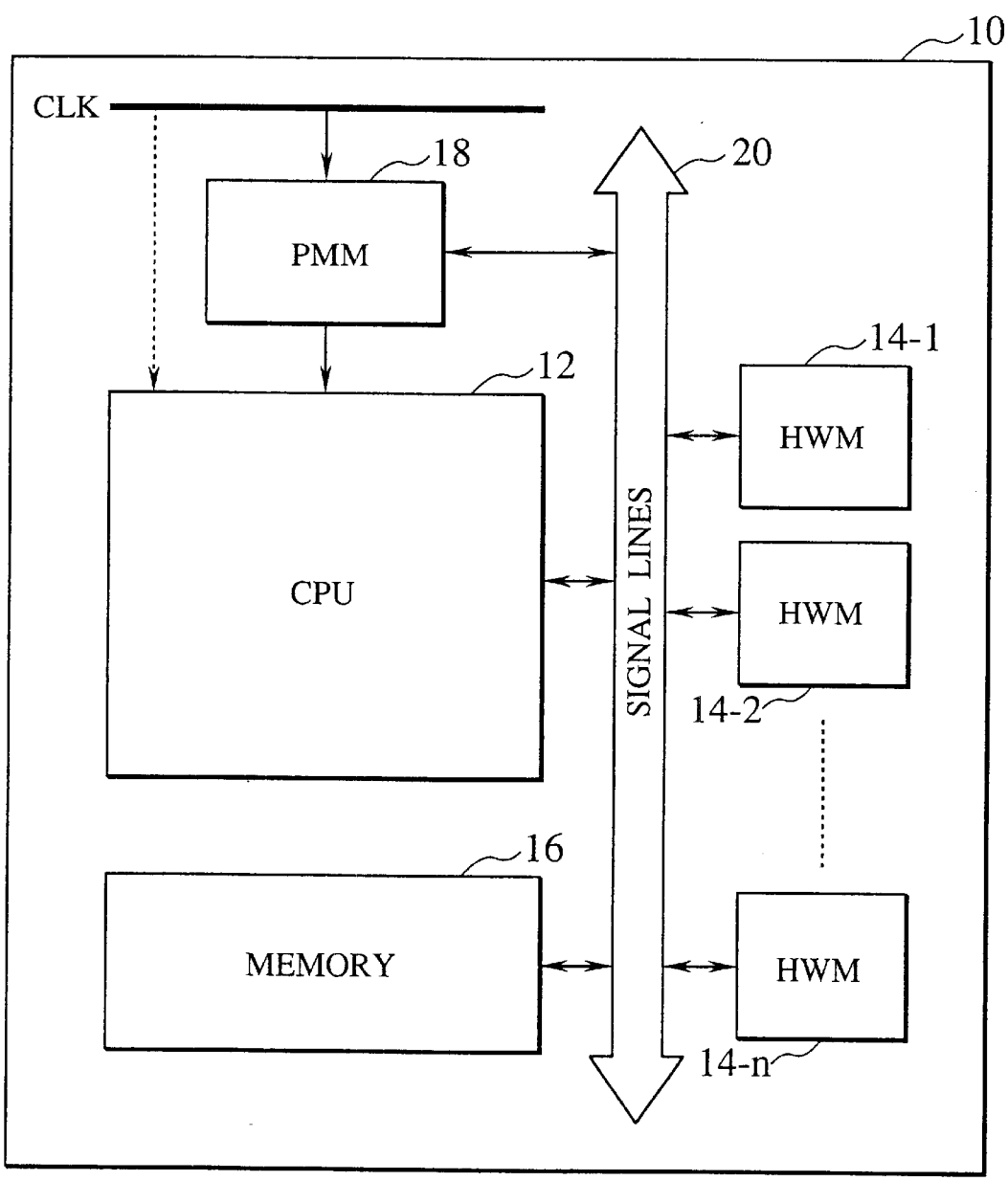
FIG. 2 is a block diagram showing a semiconductor integrated circuit according to a first embodiment of the present invention.

FIG. 2 is a block diagram showing a semiconductor integrated circuit according to the first embodiment of the present invention. The semiconductor integrated circuit is, for example, a system LSI formed on a semiconductor chip 10 and consists of a CPU 12, hardware modules 14 (14-1 to 14-n), a memory 16 for storing programs and data, and a power management device 18 for making the CPU 12 sleep and wake up signal lines 20 connect the CPU 12, modules 14, memory 16, and power management device 18 to one another to transfer signals among them. The signal lines 20 may be an internal bus such as a data bus and an address bus or dedicated lines.

Figure 3:
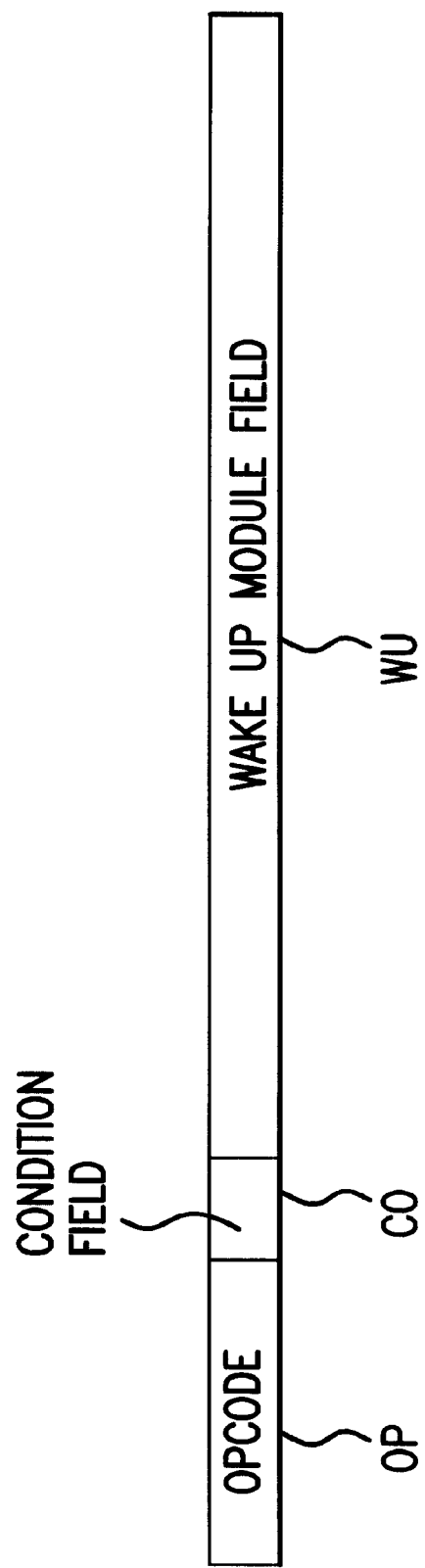
FIG. 3 shows the structure of a sleep instruction according to the first embodiment.

The CPU 12 receives a clock signal CLK through the power management device 18. If the CPU 12 contains a part (not shown) that always needs the clock signal CLK, the part directly receives the clock signal CLK from a clock signal supply line. According to the present invention, the CPU 12 is so configured to decode and execute a sleep instruction that puts the CPU 12 into a sleep state. FIG. 3 shows a sleep instruction according to the first embodiment. The sleep instruction consists of an operation code OP indicating the sleep instruction, a wake-up-module field WU, and a condition field CO. The field WU specifies modules among the modules 14 whose completion of the execution of instructions wakes up the CPU 12. The modules specified in the field WU are referred to as "wake-up modules." The field WU contains bits corresponding to the number of the modules 14, respectively, to specify at least one of the modules 14 as a wake-up module. If there are five hardware modules 14, the field WU is made of five bits that correspond to the five hardware modules, respectively. The condition field CO specifies a condition of waking up the CPU 12. When the field WU specifies a plurality of wake-up modules, the field CO specifies an AND condition that wakes up the CPU 12 when all of the wake-up modules complete the execution of given instructions, or an OR condition that wakes up the CPU 12 when any one of the wake-up modules completes the execution of a given instruction.

Figure 4:
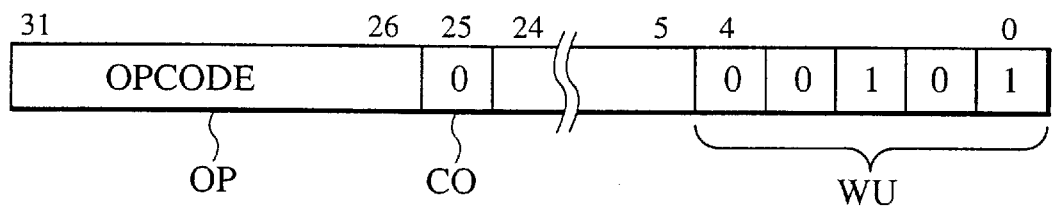
FIG. 4 shows an example of a sleep instruction having the format of FIG. 3.

FIG. 4 shows an example of a sleep instruction used for a system LSI having five hardware modules 14 (14-1 to 14-5). The sleep instruction wakes up the CPU 12 if the modules 14-1 and 14-3 both complete their processes. The sleep instruction is composed of 32 bits among which one bit is allocated for a condition field CO. The condition field CO is "0" to indicate an AND condition and "1" to indicate an OR condition. A wake-up-module field WU of the sleep instruction represents, sequentially from the least significant bit, the modules 14-1 to 14-5. If a given bit in the field WU is "1," the corresponding module is a wake-up module.

A sleep instruction according to the first embodiment is substituted for a termination routine of the prior art that only waits for completion of processes of the hardware modules 14. This will be explained with reference to FIG. 5 that shows a routine of a conventional program. An instruction "mfc" loads the values of a hardware module controlling register to a general register "r2." A register "state" is made of bits that correspond to, sequentially from the least significant bit, the modules 14-1 to 14-5, respectively and stores the operating states of the modules 14. If a given bit in the register "state" is "1," the corresponding module is executing a process.

Figure 5:
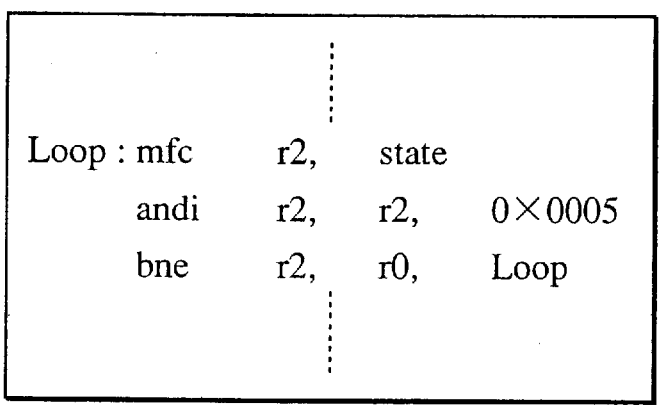
FIG. 5 shows a routine of a program according to the prior art.

The routine of FIG. 5 will be explained in detail. The values of the register "state" are loaded to the general register "r2." An AND operation "andi (and immediate)" is carried out between the values of the register "r2" and a hexadecimal number of "0x0005" to extract the operating states of only the wake-up modules 14-1 and 14-3 by using a masking function of the AND operation. An instruction "bne" compares the general register "r2" with a register "r0" whose values are always 0s. If they differ from each other, the flow branches to the instruction "mfc" under a label of "Loop." This routine makes the CPU 12 not carry out the next process until the modules 14-1 and 14-3 complete their processes. Namely, the CPU 12 can be put into a sleep state during this period. The present invention replaces the routine of FIG. 5 with the single sleep instruction of FIG. 4 to make the CPU 12 sleep while the modules are executing their processes, thereby reducing the power consumption of the CPU 12. Replacing the routine of FIG. 5 with the sleep instruction of FIG. 4 shortens a program length and reduces an instruction memory space. Also reduced is the number of accesses to the instruction memory, to reduce the power consumption of the instruction memory.

Figure 6:
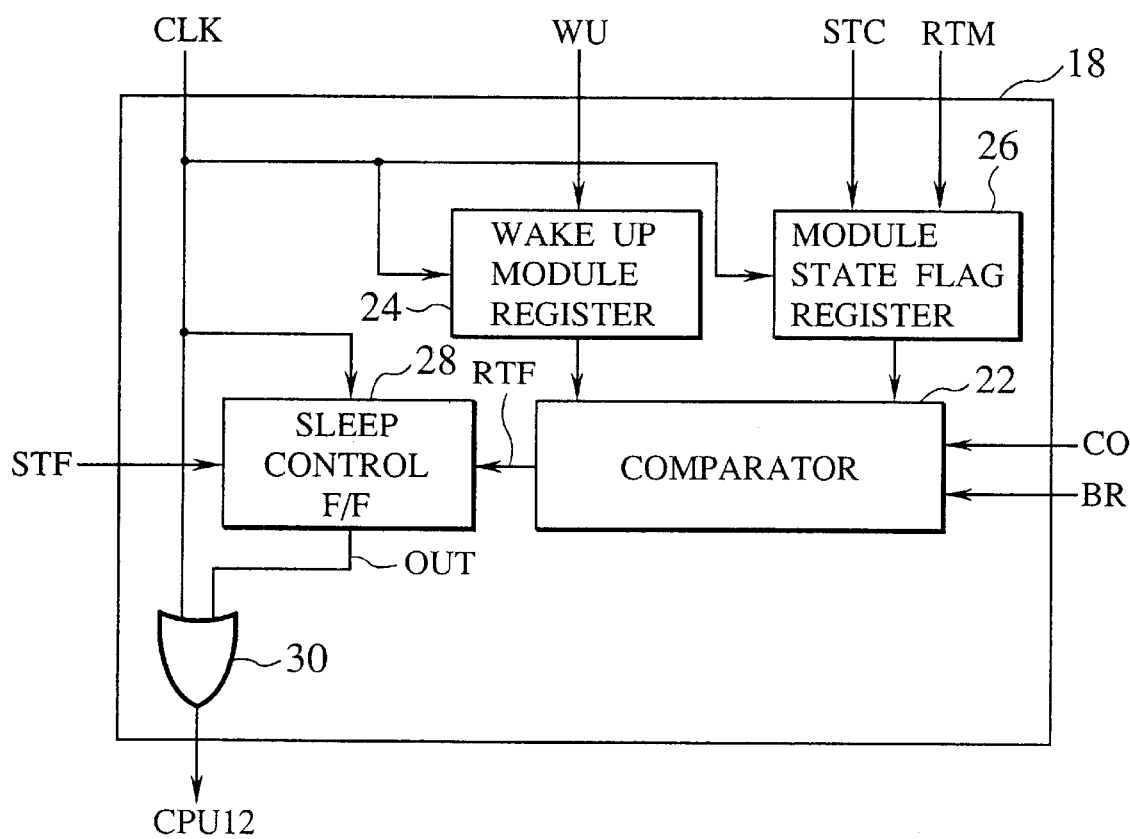
FIG. 6 is a block diagram showing a power management device according to the first embodiment of the present invention.

FIG. 6 is a block diagram showing an example of the power management device 18 of FIG. 2. The power management device 18 has a comparator 22, a wake-up-module register 24, a module-status-flag register 26, a sleep controlling flip-flop 28, and an OR gate 30. The flip-flop 28 controls the supply of the clock signal CLK to the CPU 12. The flip-flop 28 receives a set signal STF from the CPU 12 and a reset signal RTF from the comparator 22. The OR gate 30 receives an output signal OUT from the flip-flop 28 and the clock signal CLK, and depending on the output signal OUT, supplies the clock signal CLK to the CPU 12. The register 26 consists of bits that indicate the operating states of the modules 14, respectively. The register 26 is set in response to set signals STC from the CPU 12 and is reset in response to reset signals RTM from the modules 14. If possible, a register of the CPU 12 may serve as the register 26. The register 24 stores a value of the wake-up-module field WU of a sleep instruction. When the CPU 12 decodes and executes a sleep instruction, a value of the field WU of the sleep instruction is stored in the register 24. The comparator 22 determines the timing of waking up the CPU 12. The comparator 22 receives a value of the register 26, a value of the register 24, a value of the condition field CO of the sleep instruction, and a interrupt signal BR, and based on them, outputs the reset signal RTF to the flip-flop 28.

An operation of the system LSI according to the first embodiment will be explained. The system LSI is initialized first. The comparator 22 receives the interrupt signal BR and resets the flip-flop 28. The flip-flop 28 outputs an output signal OUT of "0" to the OR gate 30, which outputs the clock signal CLK to the CPU 12. The CPU 12 issues instructions to some of the modules 14 and sets "1" in bits of the register 26 corresponding to the modules to which the instructions have been issued.

When a sleep instruction is executed, a value of the wake-up-module field WU of the sleep instruction is transferred to the register 24, and a value of the condition field CO of the sleep instruction is transferred to the comparator 22. The CPU 12 outputs the set signal STF to set the flip-flop 28, which outputs "1" to the OR gate 30. As a result, the OR gate 30 provides "1" irrespective of the other input, i.e., the clock signal CLK. Namely, the OR gate 30 stops the supply of the clock signal CLK to the CPU 12, which then sleeps.

Meanwhile, the modules 14 process the instructions issued to them, and upon completion of the execution of the instructions, issue the reset signal RTM to reset corresponding bits of the register 26. The comparator 22 always compares values of the registers 26 and 24 with each other. If a comparison result satisfies a condition specified by the condition field CO of the sleep instruction, the comparator 22 outputs the reset signal RTF to the flip-flop 28, which outputs "0" to the OR gate 30. As a result, the OR gate 30 restarts the supply of the clock signal CLK to the CPU 12, which wakes up from the sleep state.

Figure 7:
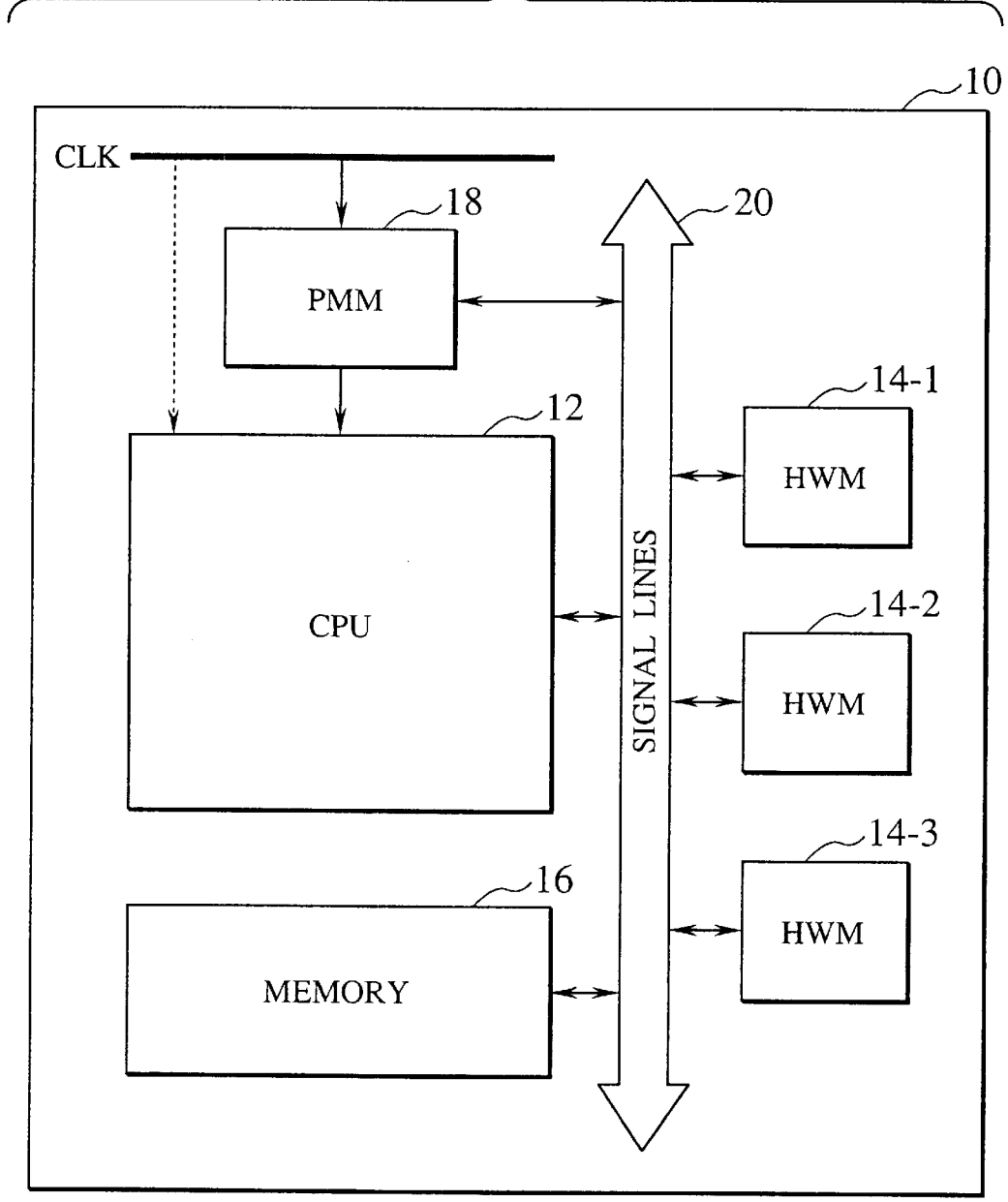
FIG. 7 is a block diagram showing a semiconductor integrated circuit having three hardware modules according to the first embodiment.
Figure 8:
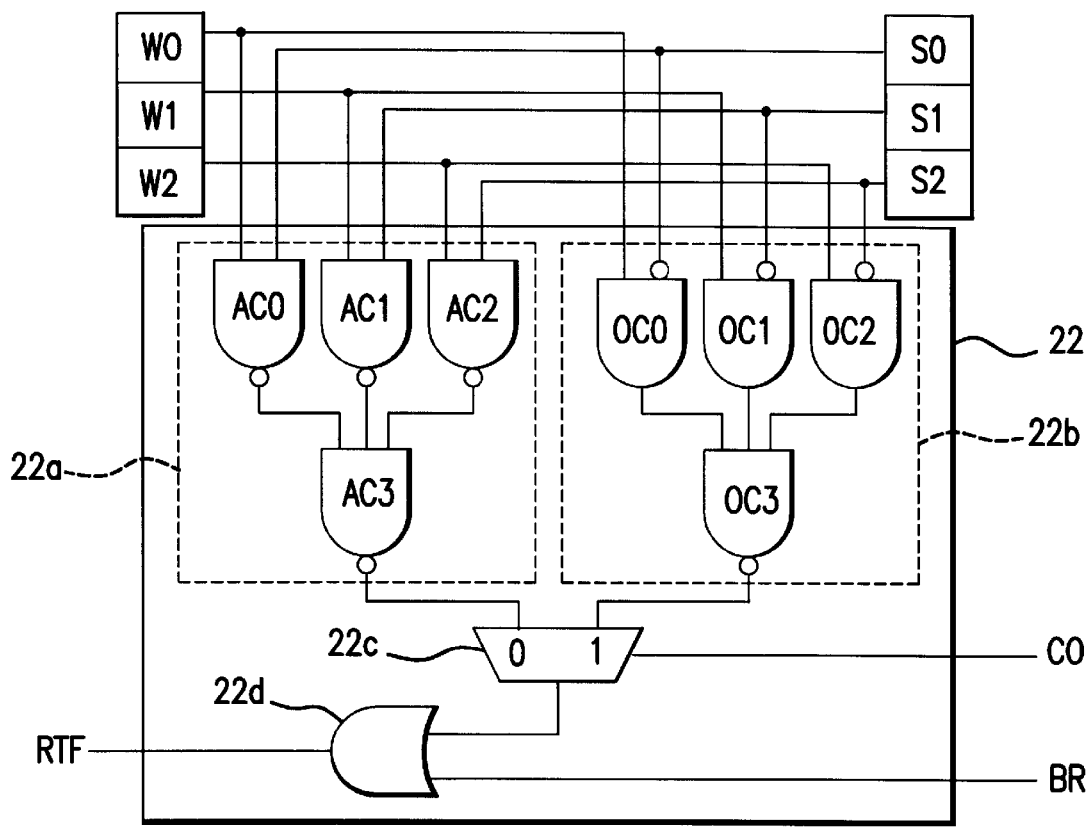
FIG. 8 is a circuit diagram showing an example of a comparator of the power management device of FIG. 6.

FIG. 7 shows a system LSI having three hardware modules 14, i.e., modules M0, M1, and M2 according to the first embodiment of the present invention. FIG. 8 is a circuit diagram showing an example of the comparator 22 of FIG. 6. The module-status-flag register 26 (FIG. 6) has bits S0, S1, and S2 corresponding to the modules M0, M1, and M2, respectively. The wake-up-module register 24 (FIG. 6) has bits W0, W1, and W2 corresponding to the modules M0, M1, and M2, respectively. The bits S0, S1, and S2 will be each "1" if the corresponding modules are processing instructions. The bits W0, W1, and W2 will be each "1" if the corresponding modules are specified as wake-up modules.

Figure 9:
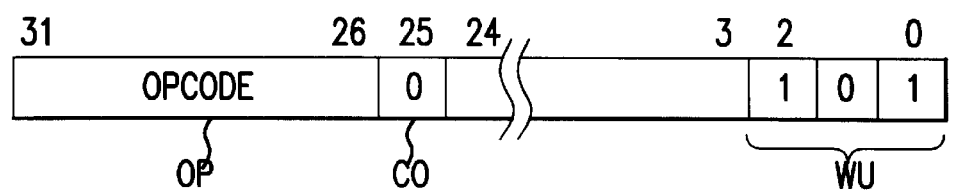
FIG. 9 shows an example of a sleep instruction used by the circuit of FIG. 7.

If the CPU 12 issues an instruction to, for example, the module M0, the bits S0, S1, and S2 will be "1, 0, 0." If the CPU 12 issues an instruction to the module M2 while the module M0 is processing the instruction, the bits S0, S1, and S2 will be "1, 0, 1." At this time, a sleep instruction of FIG. 9 is decoded and executed. The sleep instruction makes the CPU 12 sleep until both the modules M0 and M2 complete the execution of the instructions. The sleep instruction sets the bits W0, W1, and W2 to "1, 0, 1," and the comparator 22 receives "0" indicating an AND condition from the condition field CO of the sleep instruction. The flip-flop 28 receives the set signal STF from the CPU 12, to put the CPU 12 into a sleep state.

In the comparator 22 (FIG. 8), a combinational circuit of an AND block 22a and an OR block 22b compare the bits S0, S1, and S2 with the bits W0, W1, and W2. A multiplexer 22c receives the AND condition value of "0" from the condition field CO of the sleep instruction, selects the output of the AND block 22a accordingly, and outputs the selected one to an OR gate 22d. The AND block 22a has NAND gates AC0, AC1, and AC2 to receive the bits S0, S1, and S2 and the bits W0, W1, and W2. If the bits S0, S1, and S2 are "1, 0, 1" and the bits W0, W1, and W2 "1, 0, 1," the NAND gates AC0, AC1, and AC2 output 0, 1, and 0, respectively, to an AND gate AC3, which outputs 0. Since W1=0, the NAND gate AC1 always outputs 1 irrespective of the value of the bit S1 representing the operating state of the module M1. This means that only the operating states of the modules M0 and M2 specified as wake-up modules determine the output of the AND gate AC3.

When the module M0 completes the execution of the instruction, the bit S0 becomes "0" to make the output of the NAND gate AC0 "1." However, the output of the NAND gate AC2 is "0" to keep the output of the AND gate AC3 at "0." When the module M2 completes the execution of the instruction, the bit S2 becomes "0" to make the output of the NAND gate AC2 "1." Namely, the NAND gates AC0, AC1, and AC2 output each "1" so that the AND gate AC3 outputs "1." The output of the AND gate AC3 is selected by the multiplexer 22c, which outputs "1." The output of the multiplexer 22c and the interrupt signal BR are supplied to the OR gate 22d. If the interrupt signal BR is disabled, the output of the OR gate 22d will be the output of the AND gate AC3. The output of the OR gate 22d is the output of the comparator 22, i.e., the reset signal RTF. In this way, when both the modules M0 and M2 complete the execution of the given instructions, the reset signal RTF of "1" is provided to reset the flip-flop 28, which outputs "0." In response to this, the OR gate 30 resumes the supply of the clock signal CLK to the CPU 12 to wake up the CPU 12.

Figure 10:
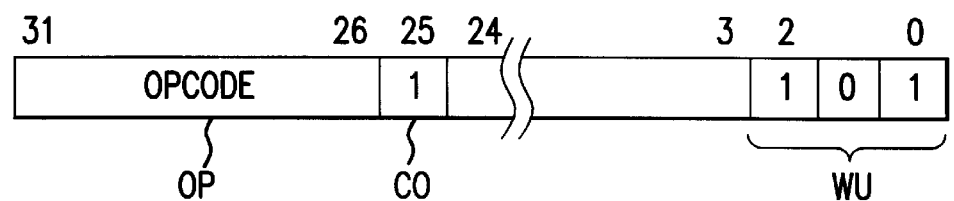
FIG. 10 shows another example of a sleep instruction used by the circuit of FIG. 7.

FIG. 10 shows another sleep instruction according to the first embodiment of the present invention. This sleep instruction keeps the CPU 12 in a sleep state until any one of the modules M0 and M2 completes the execution of an instruction. Namely, the condition field CO of the sleep instruction is "1" to specify an OR condition so that the multiplexer 22c selects the output of the OR block 22b of the comparator 22. In the OR block 22b, AND gates OC0, OC1, and OC2 receive the bits W0, W1, and W2 and inversions of the bits S0, S1, and S2. If the bits S0, S1, and S2 are "1, 0, 1" and the bits W0, W1, and W2 "1, 0, 1," the AND gates OC0, OC1, and OC2 provide each "0" to an OR gate OC3, which provides "0." Since W1=0, the output of the AND gate OC1 is always "0" irrespective of the bit S1, i.e., the operating state of the module M1. Namely, only the operating states of the modules M0 and M2 that have been specified as wake-up modules determine the output of the OR gate OC3.

If the module M0 completes the execution of the instruction to make S0=0, the output of the AND gate OC0 will be "1" and the output of the OR gate OC3 "1." This value of "1" is passed through the multiplexer 22c and OR gate 22d to provide the reset signal RTF to the flip-flop 28. As a result, the flip-flop 28 is reset to provide "0" to make the OR gate 30 provide the clock signal CLK to the CPU 12. This wakes up the CPU 12. The same explanation is applied when the module M2 completes the execution of the instruction.

If the interrupt signal BR to the comparator 22 is "1," the output of the OR gate 22d will be "1" without regard to the output of the multiplexer 22c. As a result, the reset signal RTF of "1" is supplied to reset the flip-flop 28. In this case, the OR gate 30 supplies the clock signal CLK to the CPU 12.

Although the above explanation uses AND and OR conditions to wake up the CPU 12, other logical conditions can be used by adding conditional blocks and by employing a plurality of bits in the condition field CO of a sleep instruction. If it is required to wake up the CPU 12 upon completion of processing in a specific one or any one of the modules 14, the comparator 22, wake-up-module register 24, and module-status-flag register 26 will be omitted. In this case, a result of an OR operation on a completion signal from the modules 14 and the interrupt signal BR is used to generate the reset signal RTF for the flip-flop 28. This simplifies the power management device 18.

Upon receiving the interrupt signal BR, the comparator 22 outputs the reset signal RTF to the flip-flop 28. This can be used to wake up the CPU 12 under a specific state. For example, to wake up the CPU 12 when a data bus is set to a specific state, a circuit for monitoring the state of the data bus will be added so that, when the data bus is set to the specific state, the interrupt signal BR is supplied to the comparator 22.

The power management device 18 is separated from the CPU 12 in the first embodiment. The function of the power management device 18 may be incorporated in the CPU 12. In this case, circuits corresponding to the registers 24 and 26 and the flip-flop 28 are designed to always receive the clock signal CLK.

In this way, the first embodiment uses software (a sleep instruction) to control the timing of making the CPU 12 sleep so that a programmer may optionally determine the timing of putting the CPU 12 into a sleep state. This results in properly making the CPU 12 sleep while maintaining the performance of a system LSI in which the CPU is installed. The first embodiment controls the wake-up of the CPU 12 by hardware to eliminate the need of estimation of a sleep period. The CPU 12 sleeps only for a proper period to maintain the performance of the LSI and reduce the power consumption of the LSI. The power management device 18 that realizes these effects employs simple hardware to occupy a small area and consume little power.

The first embodiment replaces a conventional termination routine that is made of a plurality of instructions with a single sleep instruction, to reduce an instruction memory space and the number of instructions to execute. While the CPU 12 is sleeping, no access is made to the instruction memory, and therefore, it is possible to make the instruction memory sleep, too. This reduces the power consumption of the instruction memory.

A pipeline system requires a sleep instruction to be executed only after the completion of a preceding instruction. For example, if the CPU 12 issues a load/store instruction to acquire data from a memory 16 (FIG. 1) for its own process and if the load/store instruction is left as it is, the other modules will be unable to access the memory 16. To avoid this problem, a necessary number of NOP instructions must be inserted before the execution of a sleep instruction.

Second Embodiment

The second embodiment of the present invention will be explained. The first embodiment mentioned above specifies a hardware module whose completion of the execution of an instruction wakes up a CPU before executing a program. On the other hand, the second embodiment specifies, during the execution of a program, a hardware module whose completion of the execution of an instruction wakes up a CPU.

Figure 11:
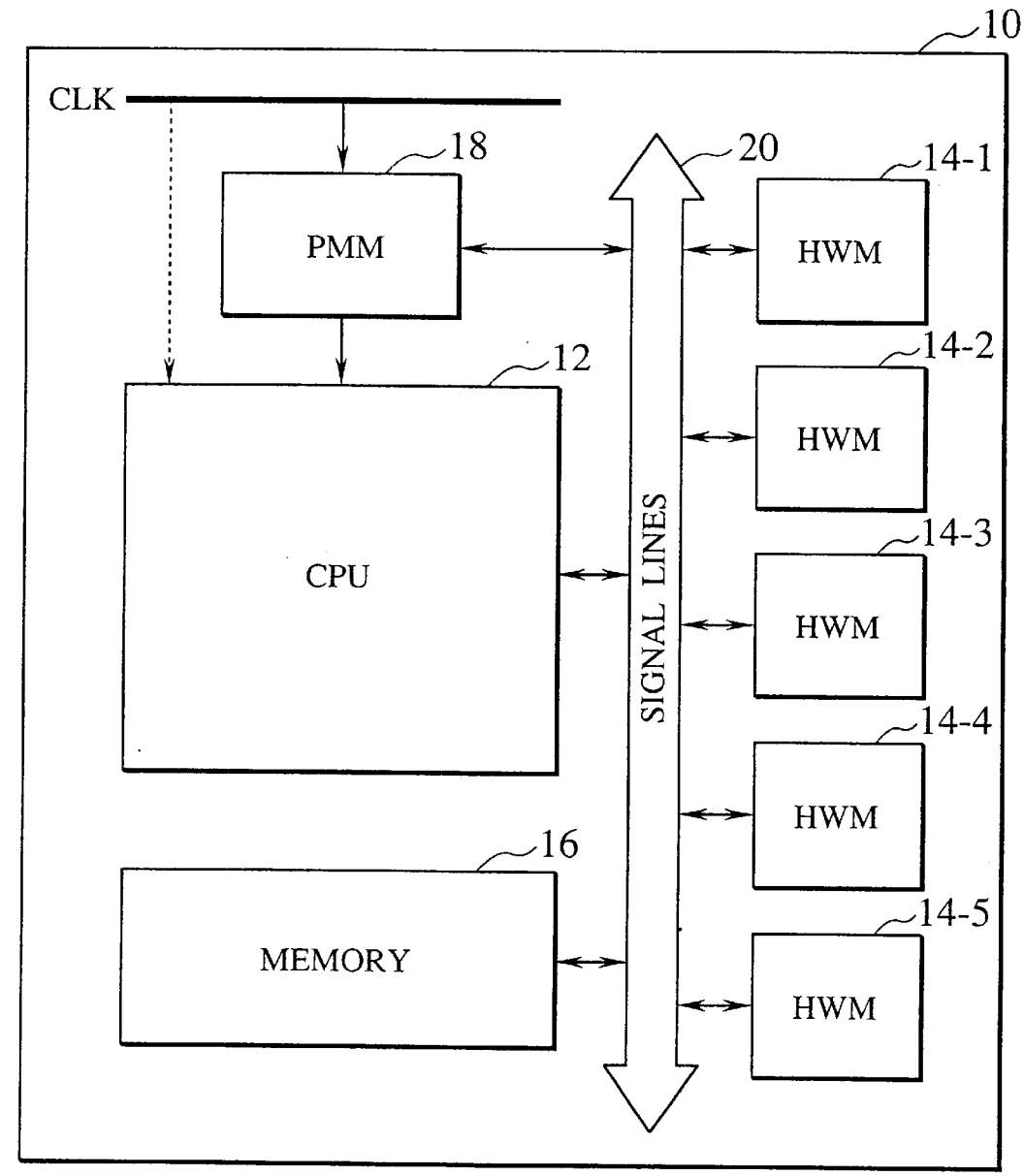
FIG. 11 is a block diagram showing a semiconductor integrated circuit having five hardware modules according to the first embodiment of the present invention.
Figure 12:
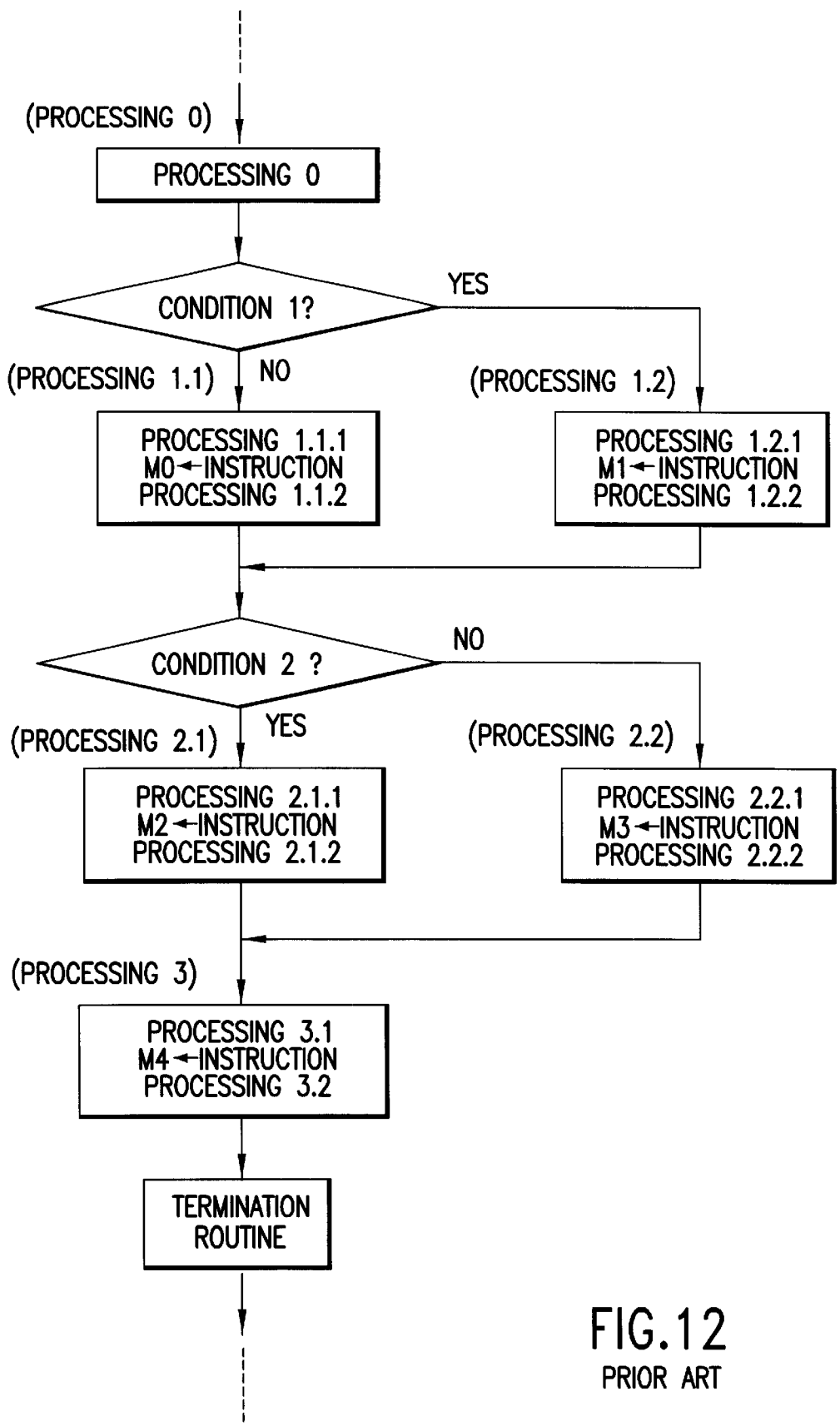
FIG. 12 is a flowchart showing a part of a program according to the prior art.

FIG. 11 shows a system LSI having five hardware modules 14 (M0 to M4) according to the second embodiment of the present invention. FIG. 12 shows a part of a conventional program executed by the LSI. Processes 1.1, 1.2, 2.1, 2.2, and 3 issue instructions to the modules M0 to M4, respectively. After the process 3, there is a termination routine that waits for the completion of the execution of the instructions by the modules which the instructions have been issued. The present invention replaces this termination routine with a sleep instruction and executes the sleep instruction to make a CPU sleep, thereby reducing the power consumption of the CPU.

FIG. 12 involves two conditional branches to change modules to which instructions are issued. It is unable, therefore, to specify in a sleep instruction a module whose completion of the execution of an instruction wakes up a CPU. To solve this problem, the second embodiment employs a sleep instruction of FIG. 13 that consists of an operation code OP and a register field RG. The register field RG specifies a register. This register stores data corresponding to the wake-up-module field WU and condition field CO of the sleep instruction of FIG. 3. When the sleep instruction of FIG. 13 is decoded and executed, the values of the register specified by the register field RG are transferred to a power management device 18 of FIG. 11, which controls the wake-up of a CPU 12.

Figure 13:
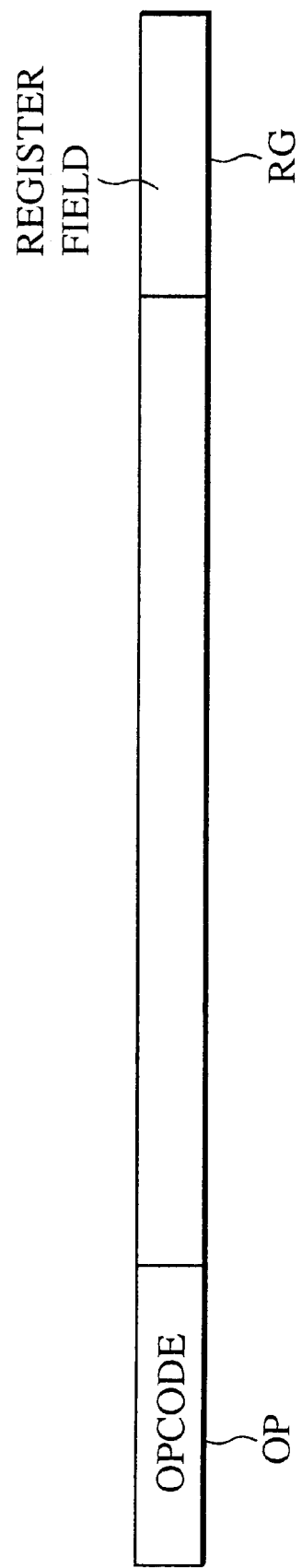
FIG. 13 shows a sleep instruction according to a second embodiment of the present invention.
Figure 14:
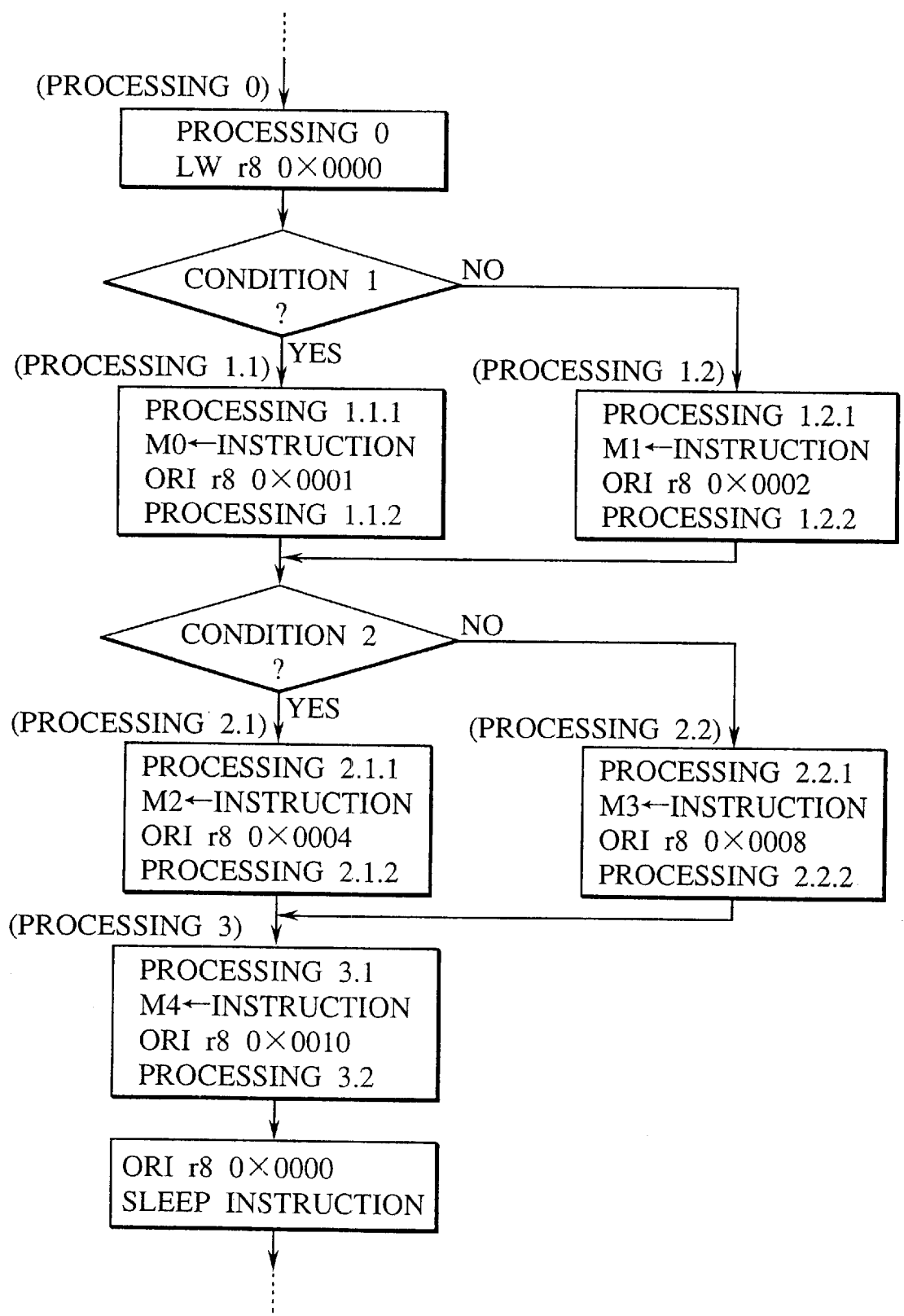
FIG. 14 is a flowchart showing a part of a program according to the second embodiment.

FIG. 14 is a flowchart showing a sequence of making the CPU 12 sleep according to the sleep instruction of FIG. 13. The most significant bit of the register specified by the register field RG of the sleep instruction corresponds to a condition field CO and five bits from the least significant bit thereof correspond to a wake-up-module field WU. The register specified by the register field RG is a general register r8. An instruction "LW" in process 0 of FIG. 14 writes a hexadecimal number of "0x0000" to the register r8, thereby initializing the register r8. In process 1.1, an instruction is issued to the module M0, and an instruction "ORI (OR immediate)" carries out an OR operation on the value of the register r8 and a value of "0x0001." Similarly, in processes 1.2, 2.1, 2.2, and 3, instructions are issued to the modules M1 to M4, OR operations are carried out on the value of the register r8 and values of "0x0002," "0x0004," "0x0008," and "0x0010," and results of the OR operations are stored in the register r8. To take the value of the condition field CO into account before the execution of the sleep instruction, an OR operation is carried out on the register r8 and "0x0000" for an AND condition or "0x8000" for an OR condition.

If the conditional branches of FIG. 14 select the processes 1.1 and 2.1 and if the condition field CO indicates an AND condition to wake up the CPU 12, the register r8 will be "0x0015" after the above operations. Namely, the sleep instruction is prepared to wake up the CPU 12 according to an AND of the modules M0 and M2.

In this way, the second embodiment stores the values of the wake-up-module field WU and condition field CO of a sleep instruction (FIG. 3) in a predetermined register. The second embodiment properly updates the values of this register by monitoring the hardware modules that receive instructions during the execution of a program, and then, issues a sleep instruction that specifies this register. Even when executing a program containing conditional branches to change hardware modules that receive instructions, the second embodiment is capable of correctly specifying modules that actually receive instructions. Consequently, the second embodiment correctly resumes the supply of a clock signal to the CPU 12.

Third Embodiment

The third embodiment of the present invention will be explained. If the CPU 12 is unable to carry out a second process until hardware modules complete a first process, the first embodiment mentioned above puts the CPU 12 into a sleep state by software (a sleep instruction) during the first process. When the modules issue a termination signal upon completion of the first process, the first embodiment wakes up the CPU 12. The sleep instruction used by the first embodiment consists of an operation code OP indicating the sleep instruction, a wake-up-module field WU to specify wake-up modules that issue a termination signal to wake up the CPU 12, and a condition field CO to specify an AND condition to wake up the CPU 12 when all of the wake-up modules complete given instructions or an OR condition to wake up the CPU 12 when any one of the wake-up modules completes a given instruction. The third embodiment automatically replaces a termination routine in a program with a sleep instruction. The third embodiment needs no manual operation to replace a termination routine with a sleep instruction. The third embodiment will be explained in detail based on the hardware structure of FIG. 11.

FIG. 15 shows an example of a termination routine contained in a program to be executed by LSI 10. An instruction "mfc" loads a value of a status register "state" for storing the operating states of the modules 14 to a general register r2. Bits of the status register "state" correspond to the modules 14, respectively, and any one of the bits is "1" if the corresponding module is executing an instruction and "0" if the corresponding module has completed the execution of an instruction.

An instruction "andi" masks the value loaded to the register r2. A third operand of the instruction "andi" is a hexadecimal number of "0x0003" to pick up the operating states of the modules M0 and M1 (serving as wake-up modules) corresponding to the zeroth (LSB) and first bits of the register "state." An instruction "bne" compares the register r2 with a register r0 whose value is always zero. If a result of the comparison shows disagreement, the routine returns to the instruction "mfc," and if it shows agreement, the routine ends. Namely, the routine of FIG. 15 waits for the completion of the execution of instructions by the modules M0 and M1.

Replacing the routine of FIG. 15 with a sleep instruction will be explained. The routine wakes up the CPU 12 when the modules M0 and M1 complete the execution of instructions issued to them. Accordingly, the wake-up-module field WU of the sleep instruction is "0x0003." To wake up the CPU 12 when both the wake-up modules M0 and M1 specified by the wake-up-module field WU complete the execution of instructions, the condition field CO of the sleep instruction contains an AND condition. As a result, the sleep instruction will be as shown in FIG. 16. The operation code OP of the sleep instruction is "111111" to indicate the sleep instruction and the condition field CO thereof is "0" to indicate an AND condition and "1" to indicate an OR condition.

FIG. 17 shows another example of a termination routine. This example stores "0x0003" in a register r3. This value is used as a mask for an instruction "and." If a masked value in a status register "state" is equal to the value of the register r3, i.e., if none of the modules M0 and M1 completes the execution of an instruction, the routine branches to "LABEL2," and if the values differ from each other to show that one of the modules M0 and M1 has completed the execution of an instruction, the routine ends. Namely, this routine waits until one of the modules M0 and M1 completes its execution of an instruction. This routine is replaced with a sleep instruction of FIG. 18. The wake-up-module field WU of the sleep instruction contains "0x0003" to indicate that wake-up modules are M0 and M1, and the condition field CO thereof is "1" to indicate that the CPU 12 is kept in a sleep state until any one of the modules M0 and M1 completes its execution of a given instruction.

Figure 19:
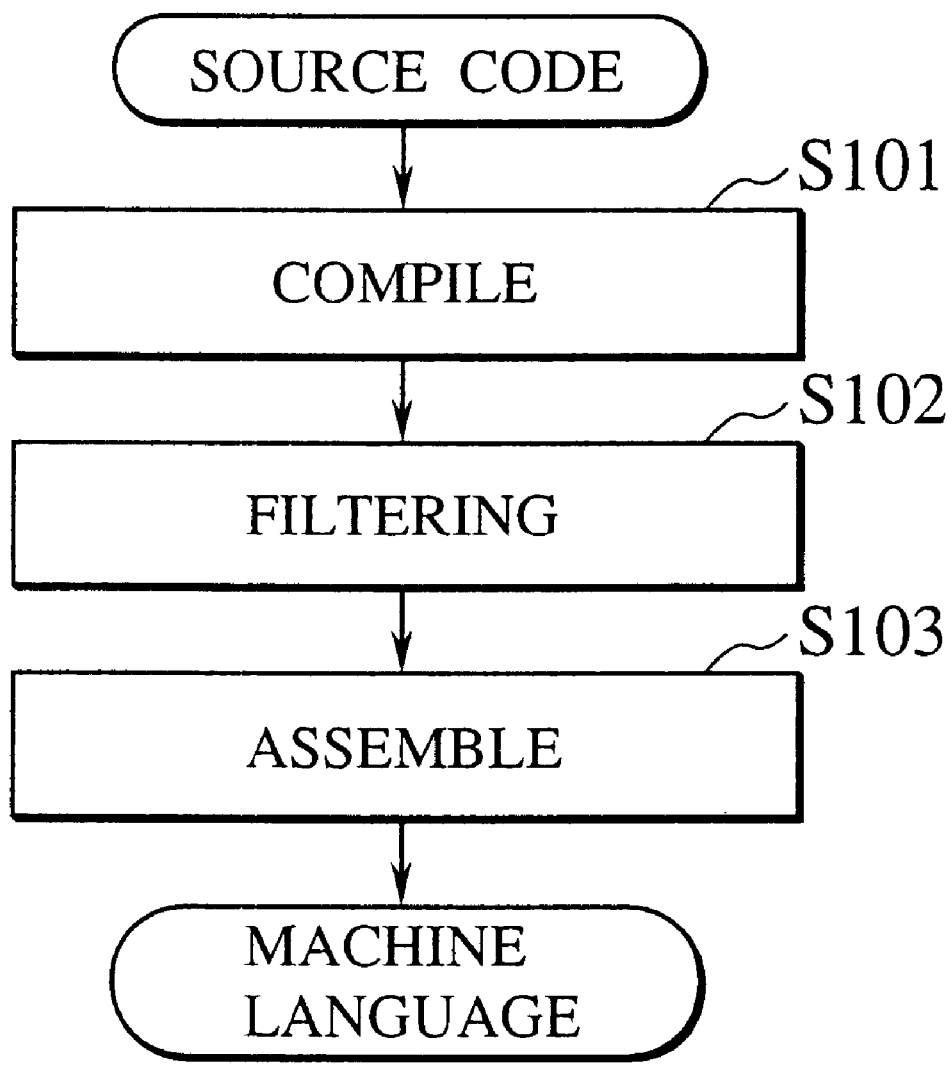
FIG. 19 is a flowchart showing a sequence of converting a termination routine into a sleep instruction.

A method of replacing a termination routine for waiting for the completion of the execution of instructions by hardware modules with a sleep instruction will be explained with reference to FIGS. 19 and 20. This method automatically generates a sleep instruction by replacing, with the use of a compiler, a procedure of generating a routine consisting of an instruction sequence with a procedure of generating a sleep instruction. In step S101, the compiler converts source codes into assembly codes. Step S102 filters the assembly codes and converts a termination routine into a sleep instruction. Step S103 assembles the converted assembly codes representing the sleep instruction into machine-language codes including the sleep instruction.

The filtering of step S102 is carried out based on a conversion table. The conversion table is made of instruction sequence of termination routines and corresponding sleep instructions. Operands of the instruction sequence are constants and variables. FIG. 20 shows an example of a conversion table for converting the routines of FIGS. 15 and 17 into the sleep instructions of FIGS. 16 and 18. The conversion table of FIG. 20 first declares variables and constants. The constants follow "$const" and include "state," "r0," "and," and "or." The variables follow "$var" and include "reg1," reg2," "imm1," and "imm2." "LABEL1" and "LABEL2" that follow "$label" are special variables called label variables used for branch determination. Each entity of the conversion table is between "$table" and "$endtable" in which "$stream" leads an instruction sequence and "$format" leads a corresponding sleep instruction format.

The filtering of step S102 will be explained in detail. Step S102 sequentially compares the assembly codes from the start thereof with the instruction sequence of the conversion table. An operation code OP in the assembly codes is compared with that in the instruction sequence. If they agree with each other, operands are compared with each other. At this time, constants in the conversion table are compared as they are with corresponding ones in the assembly codes. Variables in the conversion table are replaced with operand values in the assembly codes at the first comparison. From the second time of comparison, the substituted values are used. If a result of the comparison indicates that they agree with each other, the assembly codes are replaced with a sleep instruction format specified by "$format."

Converting the routine of FIG. 15 represented with assembly codes into the sleep instruction of FIG. 16 according to the conversion table of FIG. 20 will be explained in detail. The assembly codes start with "LABEL1:.." The location of this label is stored. The label is followed by the instruction "mfc." This instruction agrees with the first instruction in the first instruction sequence in the conversion table of FIG. 20. Therefore, operands related to the instruction "mfc" are compared. In the conversion table, the first operand of the instruction "mfc" is a variable "reg1." This variable "reg1" is replaced with a value "r2" of the first operand of the instruction "mfc" in the assembly codes of FIG. 15. The second operand "state" of the instruction "mfc" in the conversion table is a constant, and therefore, it is compared as it is with that in the assembly codes of FIG. 15. It is then determined that the operands of the instruction "mfc" agree with each other between FIG. 15 and FIG. 20. Thereafter, the next instruction "andi" is compared, and it is determined that the assembly codes and conversion table have each the instruction "andi." The first operand of the instruction "andi" is compared between the assembly codes and the conversion table. In the conversion table, the first operand of the instruction "andi" is a variable "reg2," which is replaced with the first operand "r2" of the instruction "andi" in the assembly codes of FIG. 15. The second operand of the instruction "andi" in the conversion table is "reg1" already appeared. Accordingly, it is replaced with "r2" substituted for the first "reg1." The third operand "imm1" of the instruction "andi" in the conversion table is replaced with "0x0003" of FIG. 15. Thereafter, the third instruction "bne" is compared between the assembly codes and the conversion table. The first operand "reg2" thereof is as explained above and the second operand "r0" thereof is a constant. The third operand "LABEL1" of the instruction "bne" in the conversion table is a label variable, and therefore, it is checked to see if the branching destination thereof is the same as that of the third operand of the instruction "bne" in the assembly codes of FIG. 15. In this example, they agree with each other because each of them branches to the instruction "mfc." Consequently, it is determined that the routine of FIG. 15 in the assembly codes completely agrees with the first instruction sequence in the conversion table. Therefore, the routine in the assembly codes is replaced with a sleep instruction according to the format described under "$format" for the first instruction sequence of the conversion table. At this time, the variable "imm1" is replaced with "0x0003" that has been used for comparison for the instruction "andi."

In this way, the third embodiment automatically replaces a termination routine for waiting for the completion of the execution of instructions by hardware modules with a sleep instruction. This saves labor of programmers and improves efficiency in power-consumption-reduction designing of system LSIs.

Power Management Method

Figure 21:
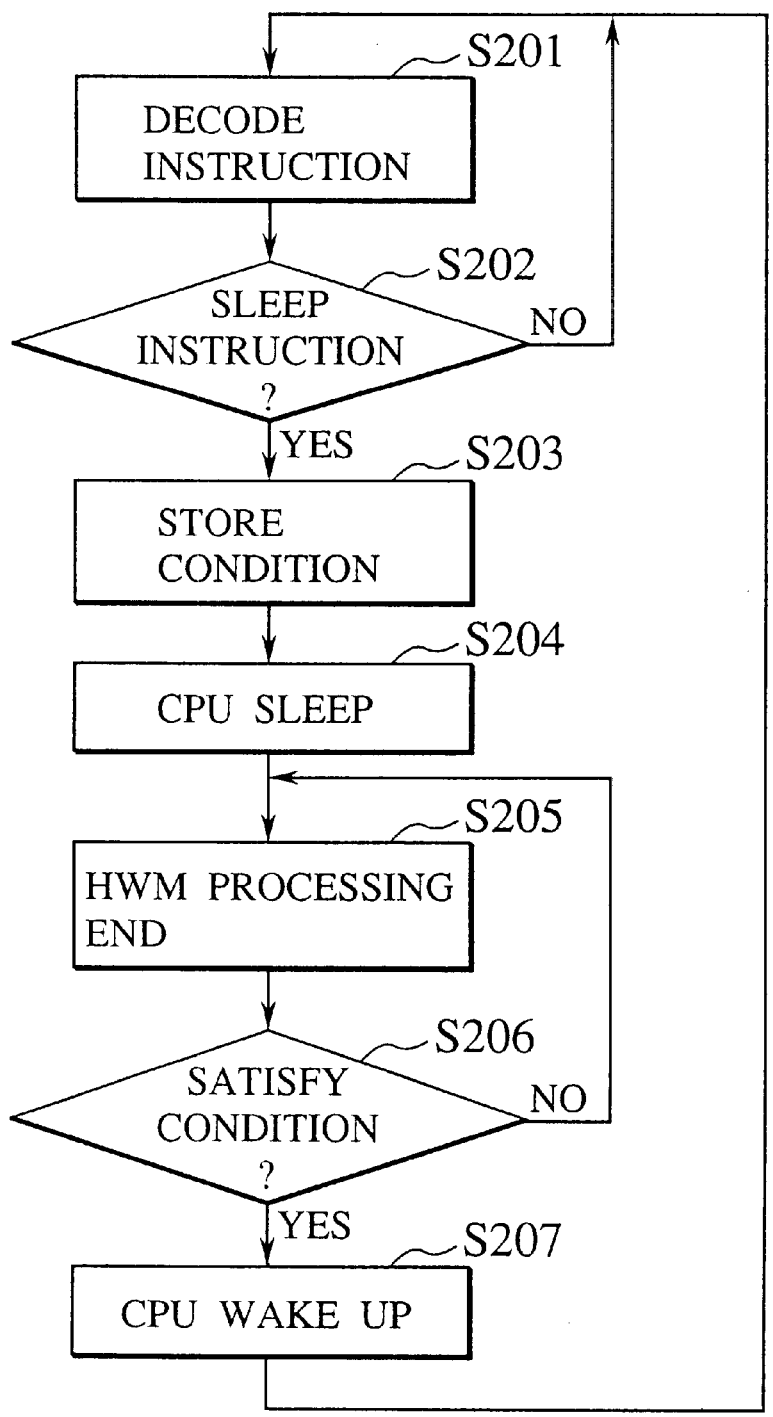
FIG. 21 is a flowchart showing a power management method for a semiconductor integrated circuit according to the present invention.

FIG. 21 is a flowchart showing a power management method for a semiconductor integrated circuit such as a system LSI according to the present invention. In step S201, the CPU 12 decodes an instruction to be executed next. Step S202 checks to see if the decoded instruction is a sleep instruction. If it is a sleep instruction, step S203 stores conditions of the sleep instruction of waking up the CPU 12 into a register. Step S204 generates a signal to stop the supply of the clock signal CLK to the CPU 12 and make the CPU 12 sleep.

While the CPU 12 is sleeping, hardware modules that have completed the execution of given instructions generate a termination signal in step S205. Step S206 checks to see if the stored conditions of restarting the supply of the clock signal CLK to the CPU 12 are met. If they are met, step S207 resumes the supply of the clock signal CLK to the CPU 12 to wake up the CPU 12.

Various modifications will become possible for those skilled in the art after receiving the teachings of the present disclosure without departing from the scope thereof.

What is claimed is:

1. A semiconductor integrated circuit comprising:
   (a) a CPU configured to execute various processes;
   (b) at least one hardware module configured to receive instructions from the CPU and to execute the instructions; and
   (c) a power management device configured to control the supply of a clock signal to the CPU so as to stop the clock signal to the CPU when the CPU has an idle time to execute the next substantial process, the power management device comprising:
      a first storage circuit configured to store data related to a combination of the hardware modules specified by a sleep instruction;
      a second storage circuit configured to store data indicating whether the hardware modules have completed the execution of instructions;
      a comparison circuit configured to determine whether data in the first and second storage circuits agree with each other; and
      a control circuit configured to stop the supply of the clock signal to the CPU when the sleep instruction is executed and to resume the supply of the clock signal to the CPU when the comparison circuit determines that data in the first and second storage circuits agree with each other.

2. The semiconductor integrated circuit of claim 1, wherein:
   the power management device stops the supply of the clock signal to the CPU if the CPU is unable to execute a subsequent process until the hardware modules complete the execution of the instructions.

3. The semiconductor integrated circuit of claim 2, wherein:
   the power management device stops the supply of the clock signal to the CPU if the CPU is unable to execute the subsequent process because the execution of the subsequent process is dependent on a result of the execution of the instructions by the hardware modules.

4. The semiconductor integrated circuit of claim 1, wherein:
   the CPU executes the sleep instruction to stop the supply of the clock signal; and
   the power management device stops the supply of the clock signal upon the execution of the sleep instruction.

5. The semiconductor integrated circuit of claim 1, wherein:
   the hardware modules inform the power management device of completion of the execution of the instructions; and the power management device resumes the supply of the clock signal upon receiving the completion information.

6. The semiconductor integrated circuit of claim 4, wherein the sleep instruction comprises:
a first field configured to specify at least one of the hardware modules; and
a second field configured to specify a combining condition of the hardware modules specified by the first field, wherein:
the power management device resumes the supply of the clock signal to the CPU upon completion of the execution of instructions by hardware modules that conform to the combining condition.

7. The semiconductor integrated circuit of claim 6, wherein:
the combining condition is one of AND, OR, and a combination thereof.

8. The semiconductor integrated circuit of claim 4, wherein the sleep instruction comprises:
a field configured to specify a temporary storage circuit that specifies at least one of the hardware modules and stores a combining condition of the specified hardware modules, the values of the temporary storage circuit being updated during the execution of a program, wherein:
the power management device resumes the supply of the clock signal upon completion of the execution of instructions by hardware modules that conform to the combining condition.

9. The semiconductor integrated circuit of claim 8, wherein:
the combining condition is one of AND, OR, and a combination thereof.

10. The semiconductor integrated circuit of claim 6, wherein:
the sleep instruction is substituted for a routine contained in a program executed by the CPU.

11. The semiconductor integrated circuit of claim 10, wherein:
the routine is a termination routine that waits for completion of the execution of instructions by hardware modules that conform to the combining condition.

12. The semiconductor integrated circuit of claim 11, wherein the substitution is carried out through:
compiling source codes of the program into assemble codes;
converting ones of the assembly codes corresponding to the termination routine into assembly corresponding to the sleep instruction into machine language codes.

13. The semiconductor integrated circuit of claim 5, wherein:
the CPU is connected to a memory for storing a program; and
the power management device stops the supply of the clock signal to the memory when stopping the supply of the clock signal to the CPU and resumes the supply of the clock signal to the memory when resuming the supply of the clock signal to the CPU.

14. The semiconductor integrated circuit of claim 13, wherein:
the CPU, hardware modules, power management device, and memory are integrated on a same semiconductor substrate.

15. The semiconductor integrated circuit of claim 14, wherein:
the CPU, hardware modules, power management device, and memory are connected by signal lines.

16. A power management method for a semiconductor integrated circuit having a CPU, at least one hardware module, and a power management device, comprising:
(a) making the CPU execute a sleep instruction to stop the supply of a clock signal to the CPU and provide the power management device with a combination of the hardware modules specified by the sleep instruction;
(b) making the power management device stop the supply of the clock signal to the CPU;
(c) making the hardware modules inform the power management device of completion of the execution of instructions given to the hardware modules; and
(d) making the power management device resume the supply of the clock signal to the CPU when a combination of the hardware modules that have made the completion information agrees with the combination of the hardware modules specified by the sleep instruction.

17. The power management method of claim 16, wherein the sleep instruction comprises:
a first field configured to specify at least one of the hardware modules; and
a second field configured to specify a combining condition of the hardware modules specified by the first field.

18. The power management method of claim 16, wherein:
the sleep instruction comprises a field configured to specify a temporary storage circuit, the temporary storage circuit specifying at least one of the hardware modules and to store a combining condition of the specified hardware modules; and
the values of the temporary storage circuit are updated during the execution of a program.

* * * * *